United States Patent [19]
Szanto et al.

[11] Patent Number: 5,176,801
[45] Date of Patent: Jan. 5, 1993

[54] SULFATE REMOVAL FROM ALKALI METAL CHLORATE SOLUTIONS AND PRODUCTION OF ALKALI METAL CHLORATE INCLUDING SAID REMOVAL

[75] Inventors: Istvan Szanto, Sevres; Marc Dietrich, Auffargis, both of France

[73] Assignee: Krebs & CIE, France

[21] Appl. No.: 665,978

[22] Filed: Mar. 7, 1991

[30] Foreign Application Priority Data

Mar. 1, 1991 [FR] France .................. 91 02502

[51] Int. Cl.⁵ .................. C25B 1/14; C25B 1/00
[52] U.S. Cl. .................. 204/86; 204/93
[58] Field of Search .................. 4/98, 128, 129, 86, 4/93; 423/166, 178, 475, 555

[56] References Cited

U.S. PATENT DOCUMENTS

| | | | |
|---|---|---|---|
| 3,970,528 | 7/1976 | Zirniebl et al. | 204/98 |
| 4,636,376 | 1/1987 | Maloney et al. | 423/475 |
| 4,702,805 | 10/1907 | Burkell et al. | 204/95 |
| 4,747,917 | 5/1988 | Reynolds et al. | 204/98 |

FOREIGN PATENT DOCUMENTS 0022117 2/1982 Japan .................. 423/499

*Primary Examiner*—John Niebling
*Assistant Examiner*—Kathryn Gorgos
*Attorney, Agent, or Firm*—Schroeder & Siegfried

[57] ABSTRACT

A process for the removal of substantially chromium free sulfate from aqueous alkali metal solutions containing chromate and sulfate which includes mixing the solutions while having a pH of between about 2.5 and 4.5 with a calcium-containing material for a time and at a temperature sufficient to form a gypsum precipitate and separating that precipitate from the solutions; as well as a process for the production of alkali metal chlorate by electrolysis of alkali metal chloride including the removal of chromium free sulfate.

16 Claims, 1 Drawing Sheet

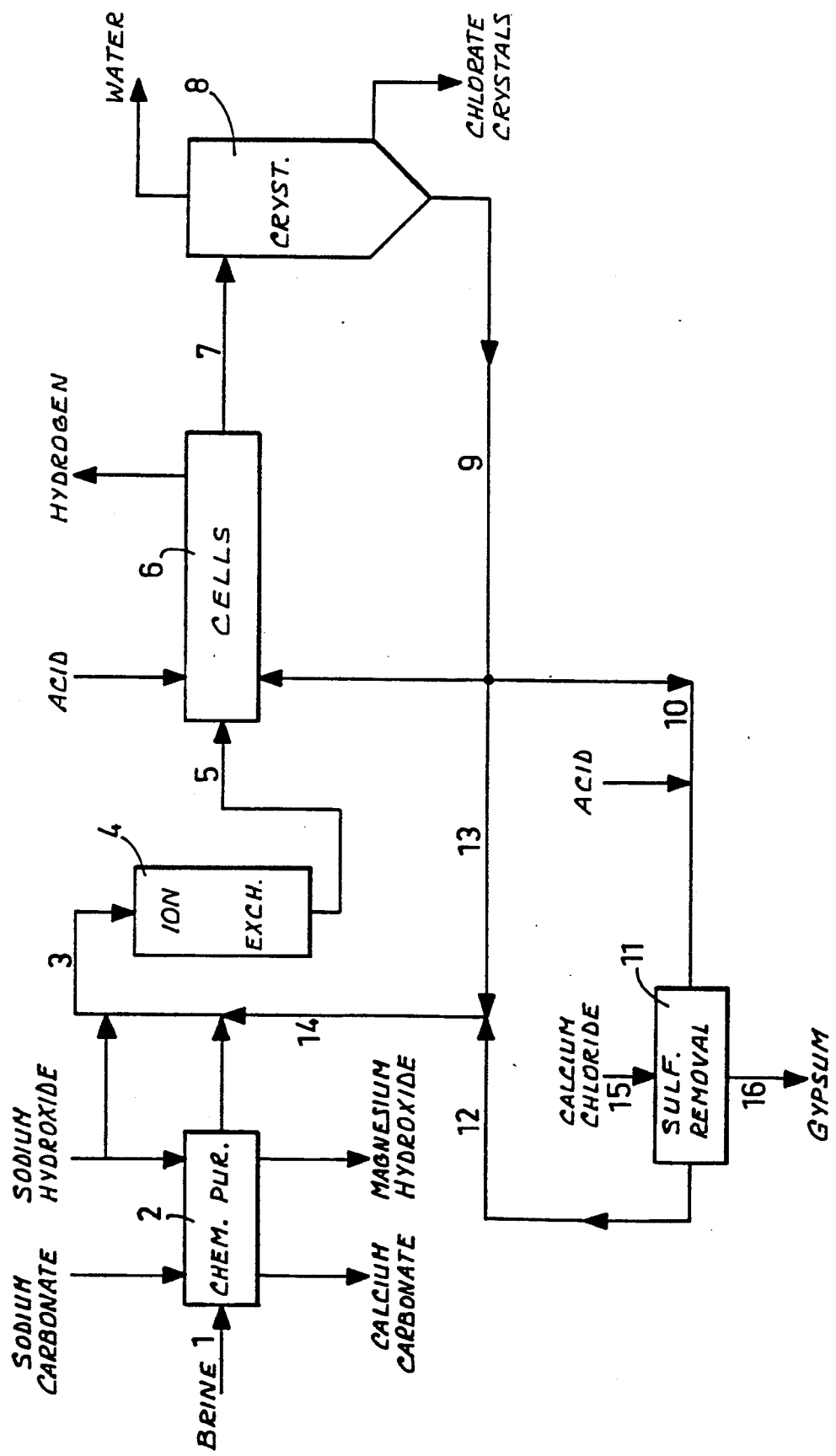

SULFATE REMOVAL FROM ALKALI METAL CHLORATE SOLUTIONS AND PRODUCTION OF ALKALI METAL CHLORATE INCLUDING SAID REMOVAL

FIELD OF THE INVENTION

The present invention relates to a process of removing substantially chromium free sulfate from aqueous alkali metal solutions containing chromate and sulfate without removing significant quantities of chromate.

Said process is advantageously carried out as part of a process for the production of alkali metal chlorate, in particular sodium chlorate. Sodium chlorate is the raw material used to produce chlorine dioxide gas when dissolved in water, for the bleaching of pulp.

BACKGROUND OF THE INVENTION

Aqueous alkali metal chlorate solutions, in particular sodium chlorate solutions, are usually produced by the electrolysis of alkali metal chloride brine in electrolytic cells. It is known to electrolyze brine to produce hydrogen, chlorine and alkali metal hydroxide and to make alkali metal hypochlorite and hypochlorous acid therefrom within the electrolytic cell. It is also know that hypochlorite and hypochlorous acid can be converted to chlorate and chloride ions according to the equation:

$$2HClO + ClO^- \rightarrow ClO_3^- + 2H^+ + 2Cl^-$$

Thus, in summary, within the electrolytic system, alkali metal chloride is, in effect, combined with water to form alkali metal chlorate and hydrogen gas. The lectrolysis takes place, typically at 60°–90° C. in electrolytic cells comprising precious metal or metal oxide coated titanium anodes and steel cathodes. It is usual to add sodium or potassium dichromate to the solution contained in the cells in order to improve current efficiency. It may be noted that the species of the chromium containing ions ($CrO_4^=$, $HCrO_4^-$, $Cr_2O_7^=$) depend on the pH value and the temperature of the solution.

The alkali metal chloride brine used as feed for the cells is normally obtained by dissolution of raw salt containing various impurities, which are detrimental to the electrolysis. The impurities are mainly present in the brine as Ca, Mg and $SO_4$ ions.

A part of calcium ion, when introduced into the electrolytic cell, forms a deposit on the cathodes. This increases the electrical resistance of the cell and results in higher operating costs due to the consumption of additional electric energy. It is the normal practise to treat the brine before introduction to the electrolysis cells with sodium carbonate and sodium hydroxide to reduce both the calcium content of the feed brine and its concentration of magnesium.

Although the effects of calcium may be reduced by primary treatment of the brine with chemicals, there remains some calcium in the brine which accumulates within the cell, resulting in an increase in electrolytic power consumption and, thus, an increase in operating costs. In recent years, it has become more common to add, after the chemical treatment of the brine, a secondary purification using ion exchange resins developed for the removal of calcium and magnesium from brine solutions. These resins remove calcium and magnesium to levels of less than 50 ppb, typically 25 ppb. This secondary purification process is particularly advantageous in areas of high electric power costs.

Sulfate ion disrupts the electrolysis only if its concentration reaches a certain level. The electrolysis may be carried out to produce chlorate as a liquor, but more and more, said chlorate is produced as a crystal. By suitable selection of the crystallization process conditions, the chloride may be kept in solution so that, after subsequent separation of the essentially pure crystal chlorate from the mother liquor, said mother liquor may be recycled to the electrolytic cells. Said recycling causes a continuous increase of the sulfate level: the sulfate of the raw material thus enters the electrolytic system and remains in the mother liquor after crystallization and is thus recycled to the cells. At sufficiently high sulfate concentration, sulfate adversely effects electrolytic power consumption and causes operating problems due to localized precipitation in the electrolytic cells. Consequently, it is compulsory to limit the sulfate concentration to an acceptable level in the electrolysis loop.

Several methods may be considered to control said sulfate concentration in crystal chlorate plants, each with its attendant disadvantages.

It is possible to maintain sulfate in the system at an acceptable concentration by means of a liquor purge, that is, an export of chlorate solution. However, the minimum proportion of total production which must be exported as liquor is then fixed by the sulfate in the salt, not the market demand, which proportion can be large, depending on the sulfate concentration in the incoming salt or brine. Furthermore, this liquor product takes with it sodium or potassium dichromate, which represents an expense to replace, and a cost to remove if it is not acceptable in the liquid product. This method of operation requires a secure outlet for the sale of the liquor, which is of reduced economic value due to higher shipping costs. It also sets the upper limit on the proportion of the plant output which may be shipped as crystal.

It is also possible to precipitate sulfate together with chromate by cooling to a low temperature a derivated stream of mother liquor at the outlet of the main chlorate crystallizer. Such a process is described in U.S. Pat. No. 4,702,805. A part of the mother liquor at the outlet of the $NaClO_3$ crystallizer (working under vacuum at 40° C.) is cooled at −5° C. The main disadvantage of such a process is the energy consumption to lower the temperature of the mother liquor from 40° C. to −5° C. In order to reduce said energy consumption, the electrolysis is run with a relatively high sulphate concentration which can damage the anode coating on one side and lower the cells efficiency by high oxygen production on another side.

An alternative method for controlling sulfate concentration is the reaction of the feed liquor to the crystallizer or mother liquor from the crystallizer, in whole or in part, with chemicals wich form sulfate compounds that are relatively insoluble in the liquor. Typical examples are the reactions with barium chloride or barium carbonate, in order to form barium sulfate, and the reaction with calcium chloride to form calcium sulfate. In some cases, the reaction with barium compounds is preferred, particularly, in those plants employing ion exchange treatment of the brine to prevent the introduction of calcium to the electrolytic cells. However, the process has several disadvantages.

A major disadvantage is that the addition of excessive quantities of barium compounds will result in excess barium entering the electrolytic cells. This barium forms sulfate deposit on the anode coating that is deleterious to cell operation. In addition to the reaction with sulfate ion, the barium will also combine with chromate to form barium chromate, and thus, sufficient barium must be added to react with chromate as well as sulfate. Part of the value of the barium added is therefore lost. Barium compounds and sodium or potassium dichromate are expensive, and this represents a significant waste of chemical reagents. The resulting barium sulfate and barium chromate sludge must be separated, and the resulting solids disposed of. This represents significant capital and operating costs.

Yet another disadvantage is that the solids produced by either the barium or calcium treatment will be contaminated with chromium in the form of chromate or dichromate which is considered environmentally undesirable.

However, there has been described in U.S. Pat. No. 4,636,376 a method to remove sulfate from alkali metal chlorate solutions, said method involving a chemical reaction with a calcium-containing material such as calcium chloride and producing a precipitate in which the chromium level is reduced (about 100 ppm). This result is achieved by such operating conditions that sulfate ions are precipitated as glauberite, a double salt of formula: $Na_2Ca(SO_4)_2$.

SUMMARY OF THE INVENTION

It has now been discovered that sulfate can be removed from an alkali metal chlorate liquor as gypsum ($CaSO_4, 2H_2O$) without said gypsum being substantially contaminated with chromium. In accordance with that discovery, a chromate and sulfate-containing aqueous alkali metal chlorate solution having a pH in the range of from about 2.5 to about 4.5 is mixed with a calcium-containing material for a time and at a temperature sufficient to form a gypsum precipitate. Said gypsum precipitate is then separated from said chlorate solution.

Said removal of sulfate from alkali metal solutions according to the invention is advantageously carried out in a continuous process for the production of alkali metal chlorate by electrolysis of alkali metal chloride. Such a process comprises—as explained above—
(a) treating an alkali metal chloride brine mainly contaminated with Ca, Mg and $SO_4$ ions, if necessary, first with chemical reagents and compulsorily through ion exchange resins to reduce its Ca and Mg levels;
(b) feeding, the so treated brine contaminated with $SO_4$ ions to a reaction zone wherein the alkali metal chloride is electrolyzed to corresponding chlorine and hydroxide, said chlorine and hydroxide are reacted to form hypochlorite and hypochlorous acid which is then reacted to produce an alkali metal chlorate-rich liquor;
(c) cooling said chlorate-rich liquor to crystallize out a portion of said alkali metal chlorate to provide crystals of said alkali metal chlorate, and a mother liquor comprising chlorate chloride and sulfate;
(d) removing said crystals of alkali metal chlorate and recycling at least a portion of said mother liquor to said reaction zone.

According to the invention, it includes the following improvement:

precipitating substantially chromium free gypsum from a derivated stream of mother liquor or from a derivated stream of the electrolyte or from a derivated stream of the electrolyzed solution before crystallization, by mixing with a calcium-containing material at a pH of from about 2.5 to 4.5;

removing said gypsum and recycling the desulfated liquor, electrolyte or electrolyzed solution to said exchange resins.

Said improvement allows the continuous production of alkali metal chlorate as crystals of high purity with a low controlled level of sulfate in the electrolysis device (about 6 to 10 g/l) and without supplementary energy consumption.

It should be noted that the chemical treatment of step (a) is not compulsory. It is possible to use a brine not very contaminated with Ca and Mg ions. In such a case, the only treatment through ion exchange resins may be sufficient.

BRIEF DESCRIPTION OF THE DRAWING

The single attached FIGURE is a flow diagram depicting a continuous process for the production of chlorate crystals by electrolysis of a brine improved by the sulfate removal according to the invention.

DETAILED DESCRIPTION OF THE INVENTION

It has been shown according to the invention that it is possible to remove sulfate ions from a chlorate liquor as a gypsum precipitate (and not as a glauberite precipitate) without removing a substantial quantity of chromium, if such removal is performed under specific conditions.

The invention is based on the discovery that if the chlorate containing solution is maintained at a pH below about 4.5, then the chromate of the solution is transformed into a species which does not crystallize in the same system as that of the calcium sulfate, in excess to its solubility level in the said chlorate solution. This difference in the crystal system ensures that there is practically no chromate in the lattice of the precipitated gypsum. Analysis has shown that the level of the chromium content in the precipitate obtained according to the invention is in the range of 10 to 20 ppm.

Such a resul is better than the one obtained with a glauberite precipitate as described in U.S. Pat. No. 4,636,376. Three advantages of the process according to the invention may actually be emphasized:
chromium levels in the precipitate are minimized;
there is no consumption of a cation other than Ca (no Na loss) to form the precipitate;
the operating conditions (time, temperature) are easier.

According to the invention, the gypsum precipitate is then produced in the chlorate solution, pH of which is between 2.5 and 4.5.

The pH has to be superior to about 2.5 to avoid the conversion of chlorate into potentially explosive chlorine dioxide. It has to be inferior to about 4.5 to allow the precipitation of gypsum substantially free of chromium. Advantageously, the pH of said chlorate solution is adjusted to a value of between 3 and 4.

The pH of the chlorate solution can be controlled to within the desired range by the addition of any typical inorganic acid which does not introduce anions able to disturb the precipitation of gypsum and possibly the further use of the treated chlorate solution (for example recycling in an electrolysis device). Hydrochloric acid is preferred.

The pH-adjustment of the chlorate solution may be realized prior to the chemical reaction with the calcium-containing material or at the same time.

The calcium-containing material is mixed with the sulfate-containing solution and maintained at a temperature and for a time sufficient to form gypsum. Said calcium-containing material can be any water soluble calcium compound, which is able to release calcium ions into the chlorate solution and which does not introduce ions able to disturb the precipitation of gypsum and the possible further use of the treated chlorate solution. It may be used as a solid or as a liquid. Whenever herein the term "calcium-containing materials" is utilized, it is intended that said term shall have this connotation. Said calcium-containing material can be a calcium compound such as calcium chloride, calcium hydroxide or lime milk. Advantageously, calcium is added to the chlorate solution as an aqueous calcium chloride solution.

The calcium-containing material is added to the chlorate solution in a continuous manner during a given period or periodically.

The temperature of the chlorate solution during treatment with the calcium-containing material is generally from about 30° C. to 50° C., preferably from about 35° C. to 45° C. In said conditions of pH and temperature, the gypsum is precipitated in a period of 1 to 2 hours.

It is very interesting that according to the invention, the desired result of producing relatively pure sodium chlorate without the loss of substantial amounts of chromium can be obtained at shuch temperature which do not imply high energy consumption. It may be noted that such temperatures are the temperatures of the mother liquor leaving the crystallizer in a continuous process fot the production of alkali metal chlorate, more particularly sodium chlorate, by the electrolysis of corresponding alkali metal chloride (sodium chloride), a process in which the sulfate removal of the invention is advantageously carried out.

The sulfate removal according to the invention is then advantageously carried out with sodium chlorate solutions. Another advantage of it is that it allows for good results in to be obtained a wide range of sulfate concentrations of said sodium chlorate solutions. The sulfate removal according to the invention may be successfully carried out with sodium chlorate solutions containing from 5 to 25 g/l of sulfate. In an electrolytic process for the production of sodium chlorate, it is advantageously carried out with sodium chlorate solutions containing from 5 to 16 g/l of sulfate, preferably from 6 to 10 g/l of sulfate.

According to a preferred embodiment of the sulfate removal process according to the invention, the chlorate solution to be treated has its pH adjusted between 2.5 and 4.5 by addition of hydrochloric acid first. Second, excess calcium is added thereto. A calcium chloride solution is actually added to the pH adjusted chlorate solution and the mixture is maintained at 35° C. to 45° C. during a period of 1 to 2 hours allowing precipitation of practically chromium-free gypsum crystals. A filtration allows the separation of said crystals, and a washing ensures the elimination of the mother liquor from the separated crystals.

One skilled in the art is able to optimize the used quantity of the calcium-containing material necessary to remove the desired quantity of sulfate, taking into account the one to one stoechiometric ration of sulfate to calcium in gypsum, $CaSO_4, 2H_2O$ and the value of the $pK_s$ of said salt at the reaction temperature.

When the sulfate removal reaction of the invention is carried out in a continuous process for the production of alkali metal chlorate by the electrolysis of alkali metal chloride—said process involving the recycling of the stream treated with the calcium-containing material, —it is compulsory to optimize the used quantity of said calcium-containing material taking into account that calcium ions constitute an impurity for the electrolysis (as explained above). The Ca content of the recycled stream has to be carefully controlled insofar as said stream cannot be recycled upstream to the chemical purification (which precipitates Ca as calcium carbonate) to avoid the precipitation of chromium. It is only possible to recycle the treated stream upstream to the ion exchange resins. This is why the Ca content of said recycled stream has to be carefully controlled. One skilled in the art is able to control said Ca content as illustrated below.

The present invention is illustrated by the following examples which are illustrative only.

EXAMPLE 1

Batch Sulfate Removal

An amount of 40 ml of an aqueous solution containing about 150 g/l calcium chloride ($CaCl_2$) 15 added to 1 liter of a chlorate liquor containing:

128 g/l sodium chloride (NaCl)

500 g/l sodium chlorate ($NaClO_3$)

5.2 g/l sodium dichromate ($Na_2Cr_2O_7$) (4.2 g/l $Cr_2O_7^{32}$ ).

6 g/l sulfate ($SO_4^=$)

and pH of which has been adjusted by the addition of hydrochloric acid (HCl) to a value of 4.

The mixture is stirred at 30° C. for 1 hour. The resultant precipitate is removed by filtration from the chlorate liquor and washed with demineralized water.

Its analysis shows that it contains 0.004% in weight of chromate ions ($Cr_2O_7^=$).

The filtered liquor contains 3 g/l sulfate ($SO_4^=$) and 0.8 g/l calcium ($Ca^{++}$).

EXAMPLE 2

Batch Sulfate Removal,

An a amount of 170 ml of an aqueous solution containing about 150 g/l calcium chloride is added to 1 liter of a chlorate liquor containing:

128 g/l sodium chloride (NaCl)

500 g/l sodium chlorate ($NaClO_3$)

5.2 g/l sodium dichromate ($Na_2Cr_2O_7$) (4.2 g/l $Cr_2O_7^=$).

20 g/l sulfate ($SO_4^=$), and pH of which has been adjusted by the addition of hydrochloric acid (HCl) to a value of 4.

The mixture is treated as in example 1.

The resultant precipitate contains 0.0035% in weight of chromate ions ($Cr_2O_7^=$).

The filtered liquor contains 3.1 g/l sulfate ($SO_4^=$) and 0.8 g/l calcium ($Ca^{++}$).

EXAMPLE 3

Continuous Process for the Production of Chlorate Crystals by Electrolysis of a Brine Involving the Sulfate Removal A typical schematic flow sheet of an electrolytic process involving the sulfate removal according to the invention is represented on the single attached figure. It is presently used to illustrate a way of producing pure sodium chlorate crystals keeping sulfate level at a determined value in the electrolysis loop.

According to said flow sheet, sulfate removal is carried out on a derivated stream (10) of mother liquor (9). It was also possible to carry it out on a derivated stream of the electrolyte (5) or on a derivated stream of the electrolyzed solution (7).

According to said flow sheet, brine containing impurities such as $Ca^{++}$, $Mg^{++}$, $SO_4^=$ is introduced via line (1) to chemical purification tank (2) where sodium hydroxide and sodium carbonate are added to precipitate calcium carbonate and magnesium hydroxide which are removed by filtration. Chemically treated brine is sent via line (3) to the ion exchange unit (4). Said chemically treated brine is mixed with the desulfated liquor (12) coming from the sulfate removal unit (11) and with a derivated flow (13) of mother liquor (9). If necessary, the pH of the mixture entering in the ion exchange unit (4) is increased by the addition of sodium hydroxide to it. The ion exchange unit (4) allows for the maintenance of the Ca+Mg level under 50 ppb in the treated solution (in fact to a value ≦20 ppb).

The pH and temperature of the solution are controlled to prevent any resins deterioration in this $NaCl+NaClO_3+Na_2Cr_2O_7$ medium.

The purified brine flows via line (5) to the cells (6) in which the pH is adjusted between 6 and 6.5 (by HCl addition) and a portion of NaCl is converted into $NaClO_3$.

The electrolyzed solution flows via line (7) to a vacuum crystallizer (8) in which the temperature is lowered to a value between 30° and 45° C. Pure sodium chlorate crystals are generated in said crystallizer and then separated.

A part of the mother liquor is directly returned to the cells. Another part is derivated to the ion exchange unit via line (13). A third part is sent via line (10) to the sulfate removal unit (11). Its pH is adjusted to between 2.5 and 4.5 by HCl addition. In said sulfate removal unit (11), calcium chloride is added to precipitate a part of the sulfate as calcium sulfate, crystals of which are separated and washed. Mother liquor from this treatment is also sent to the ion exchange unit via lines (12)+(14).

One skilled in the art is able to determine and optimize the suitable flowrates. It has been found very advantageous to eliminate about half the sulfate contained in a part of the mother liquor stream (9); said part (10) having a flow rate approximately equal to $$2 \times \frac{P_1}{C_1} \text{ (m3/h)},$$

$P_1$ representing the flow of sulfate (kg/h) contained in the brine (1) and $C_1$ the concentration of sulfate (kg/m3) which has to be maintained in the electrolysis loop. Typical flowrates are given in the table below.

TABLE

| Species | Stream 1 | 5 | 10 | 12 | 15 | 16 |
|---|---|---|---|---|---|---|
| Total kg/h | 7796.05 | 856618.04 | 352.34 | 364.99 | 8.72 | 2.09 |
| NaCl kg/h | 2001.18 | 8320.49 | 34.24 | 36.19 | — | — |
| $NaClO_3$ kg/h | — | 32444.10 | 133.51 | 133.51 | — | — |
| $Ca^{++}$ kg/h | 0.05 | 0.00 | 0.00 | 0.15 | 0.63 | 0.4 |
| $Mg^{++}$ kg/h | 0.01 | 0.00 | 0.00 | 0.00 | — | — |
| $SO_4^=$ kg/h | 1.21 | 560.62 | 2.31 | 1.15 | — | 1.1 |
| $H_2O$ kg/h | 5793.10 | 43698.29 | 179.83 | 192.0 | 6.98 | — |
| NaCl g/l | 304.5 | 137.0 | 137.0 | 138.2 | — | — |
| $NaClO_3$ g/l | — | 534.1 | 534.1 | 510.0 | — | — |
| $SO_4^=$ g/l | 0.184 | 9.22 | 9.24 | 4.39 | — | — |
| flow-rate m³/h | 6.571 | 60.75 | 0.250 | 0.262 | 0.007 | — |

| | |
|---|---|
| $SO_4$ | 55% |
| Ca | 22.5% |
| Na | 0.35% |
| $ClO_3$ | 0.48% |
| Cl | 0.07% |
| Cr | 0.0011% |
| $H_2O$ | 21.5% |

We claim:

1. A process of removing substantially chromium free sulfate from a chromate and sulfate-containing aqueous alkali metal chlorate solution comprising:
   (a) adjusting the pH of said chlorate solution to a value between 2.5 and 4.5;
   (b) mixing the pH adjusted-chlorate solution with a calcium-containing material for a time and at a temperature sufficient to form a sulfate-containing precipitate, the precipitate being predominantly gypsum; and
   (c) separating said gypsum precipitate from said solution.

2. The process of claim 1, wherein steps (a) and (b) take place at the same time.

3. The process of claim 1, wherein the pH of said chlorate solution is adjusted to a value between 3 and 4.

4. The process of claim 1, wherein the calcium-containing-material is an aqueous calcium chloride solution.

5. The process of claim 1, wherein the calcium-containing-material is added in a continuous manner during a given period.

6. The process of claim 1, wherein the calcium-containing-material is added periodically.

7. The process of claim 1, wherein the mixing of the pH adjusted-chlorate solution with the calcium-containing-material takes place at a temperature of from about 30° C. to 50° C.

8. The process of claim 7, wherein said mixing takes place for 1 to 2 hours.

9. A process according to claim 1, wherein the chlorate solution is a sodium chlorate solution.

10. The process of claim 1, wherein the aqueous chlorate solution with which the calcium-containing material is mixed contains from about 5 to 16 g/l sulfate prior to such mixing.

11. In an improved continuous process for the production of alkali metal chlorate by electrolysis of alkali metal chloride brine comprising:
   (a) treating an alkali metal chloride brine mainly contaminated with Ca, Mg and $SO_4$ ions through ion exchange resins to reduce its Ca and Mg levels;
   (b) feeding so treated brine contaminated with $SO_4$ ions to a reaction zone wherein the alkali metal chloride is electrolyzed to corresponding chlorine and hydroxide, said chlorine and hydroxide are reacted to form hypochlorite and hypochlorous acid which are then reacted to produce an alkali metal chlorate-rich liquor;

(c) cooling said chlorate-rich liquor to crystallize out a portion of said alkali metal chlorate to provide crystals of said alkali metal chlorate, and a mother liquor comprising chlorate, chloride and sulfate;

(d) removing said crystals of alkali metal chlorate and recycling at least a portion of said mother liquor to said reaction zone;

where the improvements comprises:

precipitating substantially chromium free gypsum according to the process of claim 1, from one of a group of streams comprised of a derivated stream of mother liquor, a derivated stream of the electrolyte, and a derivated stream of the electrolyzed solution before crystallization;

removing said gypsum and recycling the desulfated liquor, electrolyte or electrolyzed solution to said ion exchange resins.

12. A process according to claim 11, wherein the treated alkali metal chloride brine is sodium chloride brine.

13. A process according to claim 11, wherein the alkali metal chloride brine mainly contaminated with Ca, Mg and $SO_4$ ions is first treated with chemical reagents and secondly through ion exchange resins to reduce its Ca and Mg levels.

14. A process according to claim 1, wherein the mixing of the pH adjusted-chlorate solution with the calcium-containing-material takes place at a temperature of from about 35° C. to 45° C.

15. A process according to claim 1, wherein the aqueous chlorate solution with which the calcium-containing material is mixed contains from about 6 to 10 g/l sulfate prior to such mixing.

16. A process of removing substantially chromium free sulfate from a chromate and sulfate-containing aqueous alkali metal chlorate solution comprising:

(a) adjusting the pH of said chlorate solution to a value of between 2.5 and 4.5;

(b) mixing the pH adjusted-chlorate solution with a calcium-containing material for a period of 1-2 hours and at a temperature of 30° C.-50° C. to thereby form a sulfate-containing precipitate, the precipitate being predominantly gypsum; and (c) separating said gypsum precipitate from said solution.

* * * * *

UNITED STATES PATENT AND TRADEMARK OFFICE
CERTIFICATE OF CORRECTION

PATENT NO. : 5,176,801

DATED : January 5, 1993

INVENTOR(S) : Istvan Szanto & Marc Dietrich

It is certified that error appears in the above-identified patent and that said Letters Patent is hereby corrected as shown below:

Column 1, lines 34 & 35, change "lectrolysis" to --electrolysis--.

Column 2, line 16, change "effects" to --affects--.

Column 2, line 59, change "wich" to --which--.

Column 3, line 9, insert "commas" before and after the word --therefore--.

Column 3, line 47, insert a "colon" after --above---.

Column 3, line 58, change "is" to --are--.

Column 3, line 63, insert a "comma" after --chlorate--.

Column 4, line 46, change "resul" to --result--.

Column 5, line 33, change "shuch" to --such--.

Column 5, line 33, change "temperature" to --temperatures--.

Column 5, line 37, change "fot" to --for--.

Column 5, line 45, cancel "in" and insert it after the word --obtained--.

Column 6, line 1, change "ration" to --ratio--.

Column 6, line 31, change "15" to --is--.

Column 6, line 37, cancel "32" and substitute therefor --=--.

UNITED STATES PATENT AND TRADEMARK OFFICE
CERTIFICATE OF CORRECTION

PATENT NO. : 5,176,801
DATED : January 5, 1993
INVENTOR(S) : Istvan Szanto & Marc Dietrich It is certified that error appears in the above-identified patent and that said Letters Patent is hereby corrected as shown below:

Column 6, line 51, cancel "," after --Removal--.

Column 8, line 16, insert --Stream (16) has the following Composition in Weight:--.

Signed and Sealed this

Second Day of November, 1993

Attest:

BRUCE LEHMAN

Attesting Officer *Commissioner of Patents and Trademarks*